July 28, 1959  F. M. REISING  2,896,342
EXCAVATING MACHINE
Filed July 15, 1953  15 Sheets-Sheet 2

INVENTOR
Francis M. Reising
BY Ralph L. Bassett
ATTORNEY

July 28, 1959　　F. M. REISING　　2,896,342
EXCAVATING MACHINE
Filed July 15, 1953　　　　　　　　　　　15 Sheets-Sheet 4

INVENTOR
Francis M. Reising
BY Ralph T. Bassett
ATTORNEY

July 28, 1959

F. M. REISING 2,896,342

EXCAVATING MACHINE

Filed July 15, 1953

INVENTOR
Francis M. Reising
BY Ralph L. Barrett
ATTORNEY

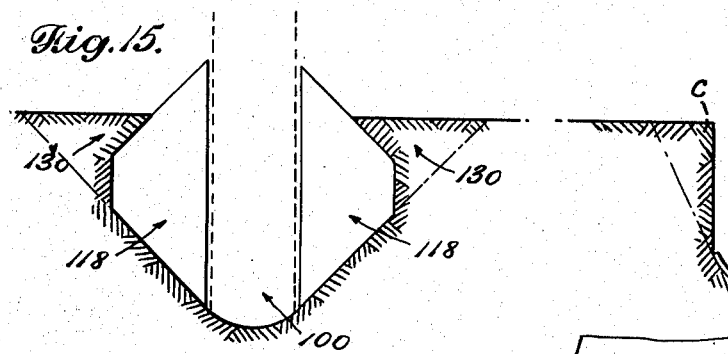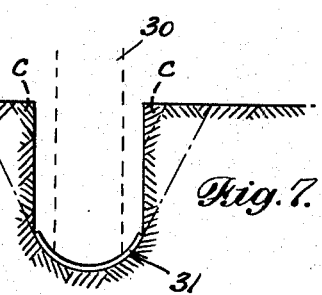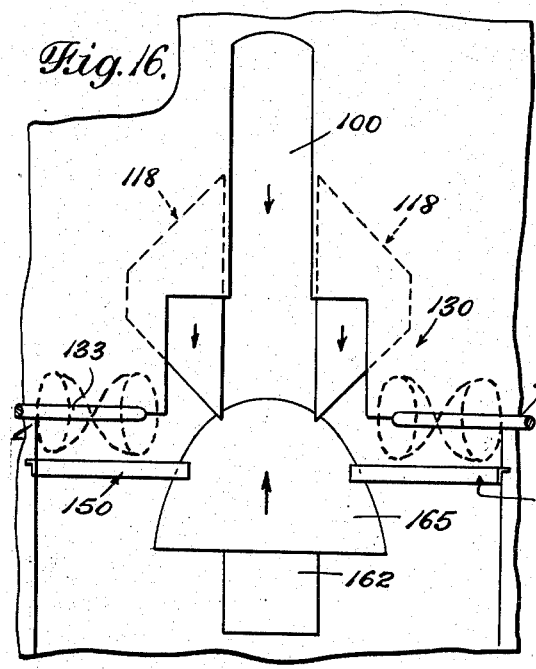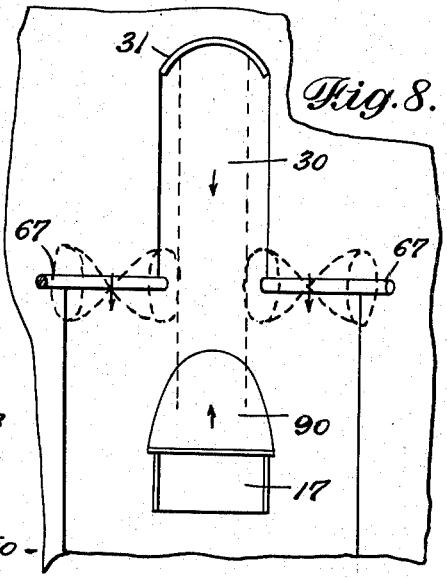

July 28, 1959  F. M. REISING  2,896,342
EXCAVATING MACHINE
Filed July 15, 1953  15 Sheets-Sheet 8

Inventor
Francis M. Reising
By Ralph T. Bassett

July 28, 1959 F. M. REISING 2,896,342
EXCAVATING MACHINE
Filed July 15, 1953 15 Sheets-Sheet 11

INVENTOR
Francis M. Reising
BY Ralph T. Bassett
ATTORNEY

July 28, 1959  F. M. REISING  2,896,342
EXCAVATING MACHINE
Filed July 15, 1953  15 Sheets-Sheet 12
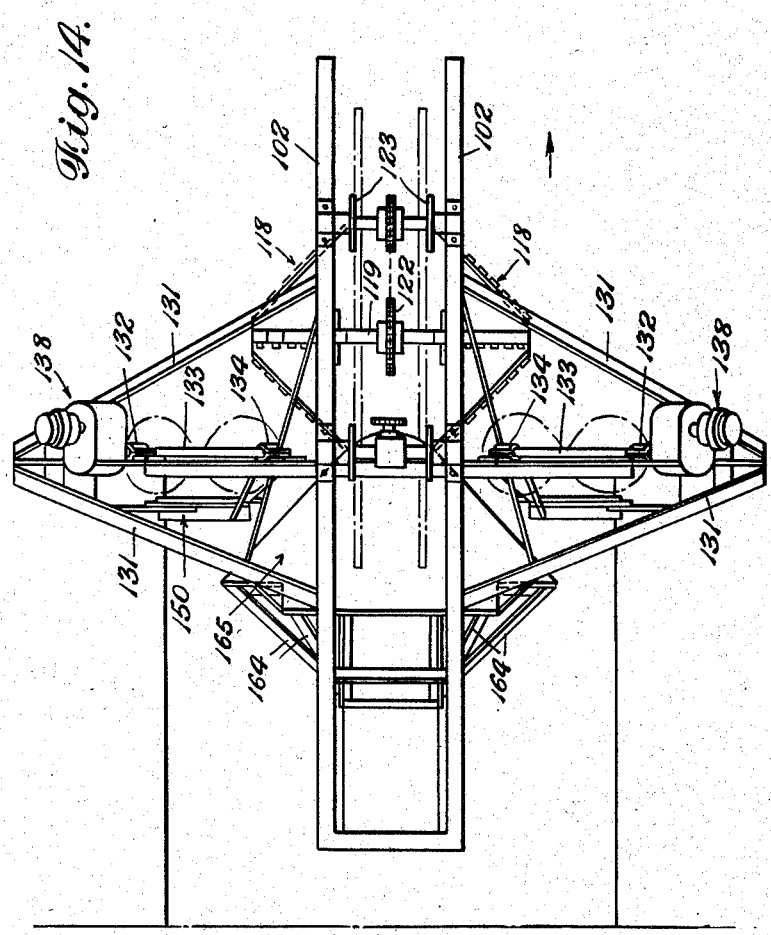
INVENTOR
Francis M. Reising
BY Ralph T. Barrett
ATTORNEY July 28, 1959

F. M. REISING 2,896,342

EXCAVATING MACHINE

Filed July 15, 1953

INVENTOR
Francis M. Reising
BY Ralph T. Bassett
ATTORNEY

July 28, 1959 F. M. REISING 2,896,342
EXCAVATING MACHINE
Filed July 15, 1953 15 Sheets-Sheet 14
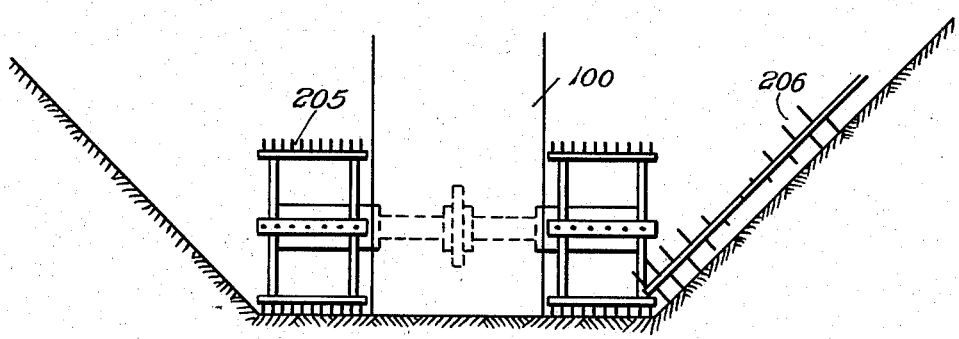
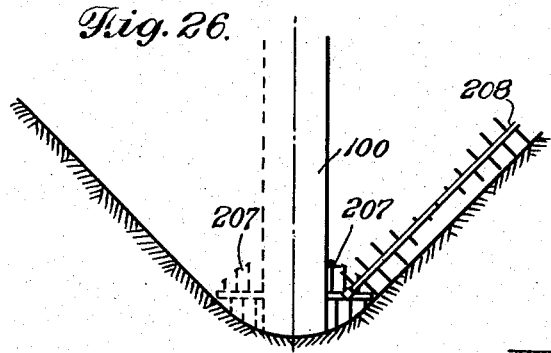
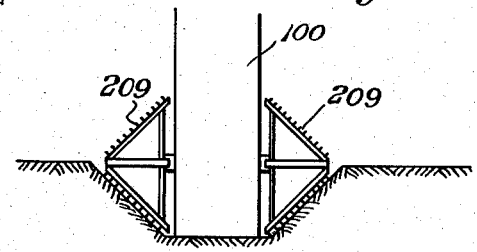
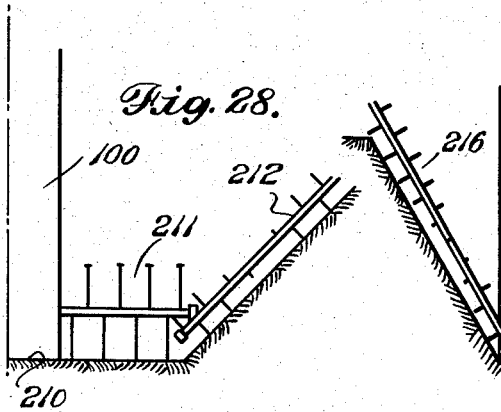
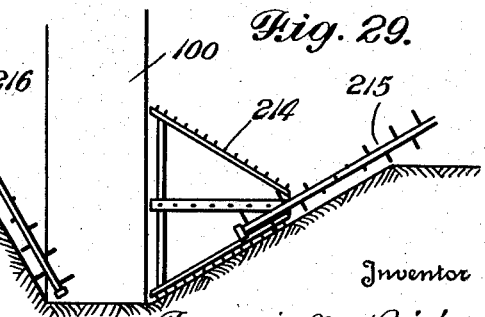
Inventor
Francis M. Reising
By Ralph T. Barrett July 28, 1959  F. M. REISING  2,896,342
EXCAVATING MACHINE
Filed July 15, 1953  15 Sheets-Sheet 15
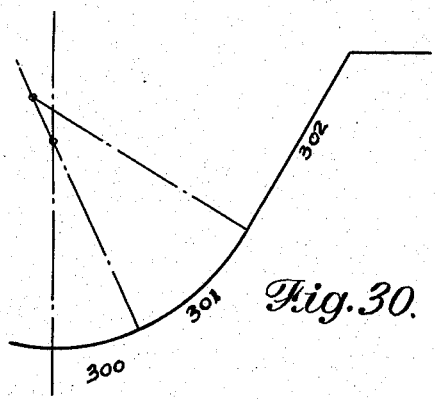
Fig.30.
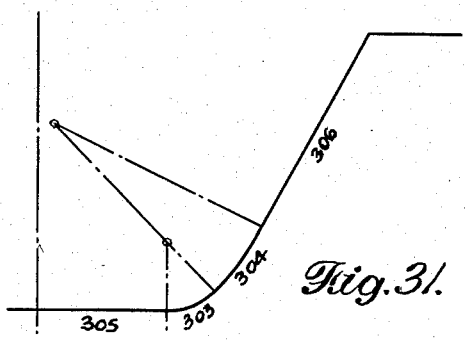
Fig.31.
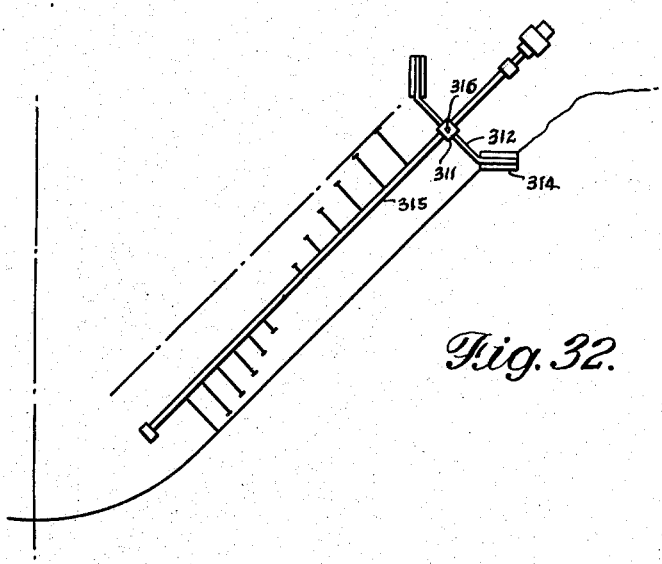
Fig.32.
Fig.33.
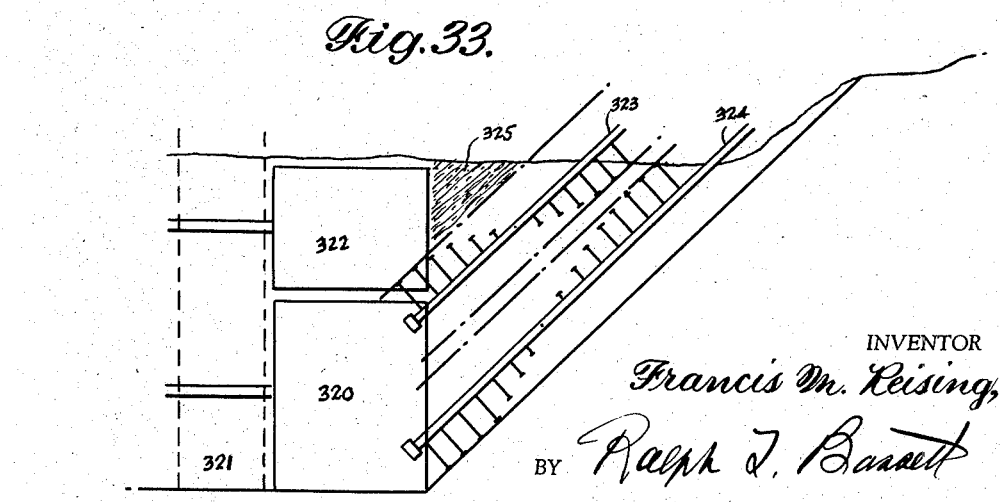
INVENTOR
Francis M. Reising,
BY Ralph J. Barrett
ATTORNEY

United States Patent Office 2,896,342
Patented July 28, 1959

2,896,342

EXCAVATING MACHINE

Francis M. Reising, Edinburg, Tex.

Application July 15, 1953, Serial No. 368,065

9 Claims. (Cl. 37—97)

Generally this invention comprehends the use of a plurality of additions to the conventional wheel type trencher to facilitate its use in fine grading trenching to a neat line and grade to prepare such trench for the application of canal lining, the latter either being of the pneumatic concrete lining, asphalt liner, brick liner or other material or combination of liner materials.

This invention relates to excavating machines of that type utilized in the forming of drainage or irrigation ditches, such ditches normally having diverging sidewalls and being prepared for layers of asphalt or paving material to resist erosion and to prevent the seepage of water. Ditches of this general type are extensively used in the western States and it is important that their construction comprehend accurate elevations to permit the flow of water therethrough.

The primary object of the present invention is to provide the conventional rotary wheel type digger or trencher, designed for a longitudinal cut and including a transverse endless conveyor, with additional means for shaping the ditch after the basic vertical wall excavating operation. Normally the conventional rotary digger or trencher includes a rotating ditching element having a plurality of buckets, the buckets removing the earth and delivering it to a transversely moving conveyor for discharge laterally of the ditch. To this applicant has added mechanism for removing in predetermined sequence triangular sections of the sidewall mass not removed by the trencher, the sequential operations performing the added functions to the basic excavator in comprehending excavating operations of a nature involving minimum load conditions on the working parts and insuring total removal of the triangular areas at each side of the ditch.

An additional feature of the invention includes the use of additional cutting elements between the conventional digger buckets on the main excavator wheel, the cutting elements extending laterally of each side of the normal bucket structures and having teeth at each side of the normal bucket structures, whereby the cut performed by the bucket structures are substantially undercut and widened for cooperation with an additional cutting element.

The invention further comprehends the use of truncated cone shaped cutters at each side of the normal rotary digger for performing a cutting operation merging with the cutting surface defined by the auxiliary cutting elements previously mentioned and normally associated between the conventional buckets.

A further object of the invention is to provide at each side of the main wheel cutters or buckets, undercutting structures of truncated cone shape which laterally enlarge the normal cutting operation of the buckets and substantially undercut the walls of the ditch.

Another object of the invention is the provision of spiral cutters for removing the overhanging portions of the sidewalls left as the result of the undercut by the truncated cone cutters following the cut of the main cutter wheel.

A further object of the invention is the provision of a moldboard, this moldboard having a contour corresponding to the contour of the ditch which is being cut by the means set forth above and functioning to smooth the walls which may be left irregular as the result of the operation of the cutting teeth on the main digger or on the auxiliary digger mentioned.

In general this invention comprehends the use of auxiliary rotating cutters placed on each side of the trencher wheel for widening the trench bottom or forming part or all of the bottom, together with the side radius of the trench wall, and including with this structure rotating slope cutters which consist of shafts with cutter arms and cutter teeth, these slope cutters being adjustable to secure the desired degree of slope of the trench wall for providing fine grading of the tangential sections of the trench wall preparatory to placing the liner material thereon.

Other features of the invention reside in the provision of supporting mechanism for association with the normal standard equipment now used in the supporting of rotary ditch diggers, the mechanism being such as to avoid interference with the initial cutting operation of the rotary digger by functioning with the rotary digger in providing for a predetermined cut in accordance with the gauge equipment associated with the main assembly.

Further objects of the invention will more clearly hereinafter appear by reference to the accompanying drawings forming a part of the instant specification, wherein like characters of reference designate corresponding parts throughout the several views, in which:

Fig. 7 is a diagrammatic view showing the initial cut of the excavator wheel of the structure of Fig. 1;

Fig. 8 is a diagrammatic top plan view showing the nature of the cut and the relative position of the parts in operation;

Fig. 9 is a transverse section of a finished ditch made by the structure of Fig. 1;

Fig. 14 is a top plan view of the assembly shown in Fig. 10;

Fig. 15 is a diagrammatic view showing a section of a trench after excavation by the conical side wheel undercutters;

Fig. 16 is a diagrammatic top plan view showing the relative position of the various cutters in a trenching operation;

Fig. 17 shows a transverse section of a finished trench made by the assembly in Fig. 10;

Fig. 25 is a diagrammatic transverse section of a modified assembly in which cylindrical cutters are substituted in lieu of conical cutters;

Fig. 26 is a similar view showing the main trencher wheel associated with arcuate undercutters and side slope cutters;

Fig. 27 shows a trencher wheel with flat transverse cut associated with conical cutters;

Fig. 28 shows a trench cutter wheel associated with a side slope cutter and a bottom cutter, both of the latter including spirally arranged cutter arms;

Fig. 29 shows a modification in which the side slope cutters are at relatively modified angles, and one of the slope cutters is associated with a conical undercutter;

Fig. 30 is a diagrammatic partial section of a trench modification in which the side trench wall is modified by a further association of parts;

Fig. 31 is a further diagrammatic partial section of a trench modified by a different arrangement of arcs, curves and tangents as provided by a further modified arrangement of cutters;

Fig. 32 is a diagrammatic partial section showing the use of a striking arm at the upper portion of the slope cutter to provide a horizontal strike-off; and Fig. 33 is a similar view showing the use of superimposed slope cutters and side cutters.

Figure 1:
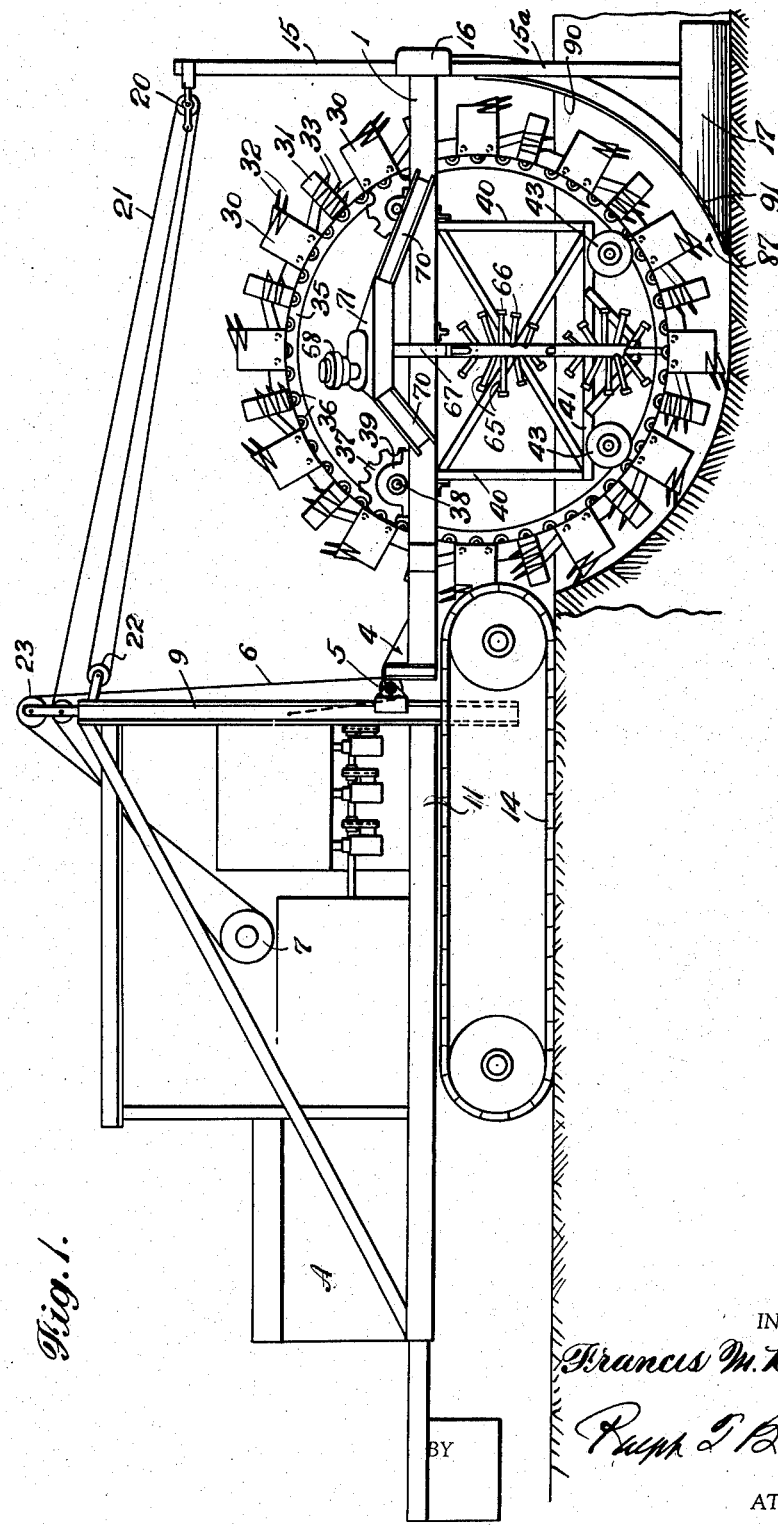
Fig. 1 is a side elevation showing one form of the invention in operating position in a ditch.

Referring to the drawings, two developments are illustrated, the first type being shown in Figs. 1, 2, 3 and 4. In the first type of development the rotating digger wheel is mounted on a horizontal frame, including pairs of side frame members 1 and 2, outer end frame member 3 and inner or front frame structure 4, the latter mounting pulleys 5 for association with a cable 6 extending to a power winch 7, whereby the frame may be vertically adjusted on the uprights 9 and 10 fixed to the frame 11 of the tractor. The tractor is provided with a suitable power plant A and moves on endless belts 14 which are laterally spaced to travel at each side of the area forming the longitudinal medial line of the trench. The outer ends of the side frame members 1 and 2 are connected by the transverse outer end connection 3 and to this member 3 the uprights 15 are fixed, preferably by a clamp box 16 as shown in Fig. 1. Depending hangers 15ª are supported by the framing and carry at their lower ends a shoe 17, the shoe 17 forming the support for the outer free end of the wheel frame and normally travelling at the bottom of the finished trench.

The upper end of the outer uprights 15 are provided with blocks 20 and through cables 21 and associated blocks 22 and 23 connect with the winch assembly 7 for raising and lowering the wheel or trencher assembly. While the present illustration shows a trencher of the wheel type, it will be obvious to one skilled in the art that the instant invention might be adapted for use in connection with other types of trenchers such as ladder bucket chain type.

Figure 2:
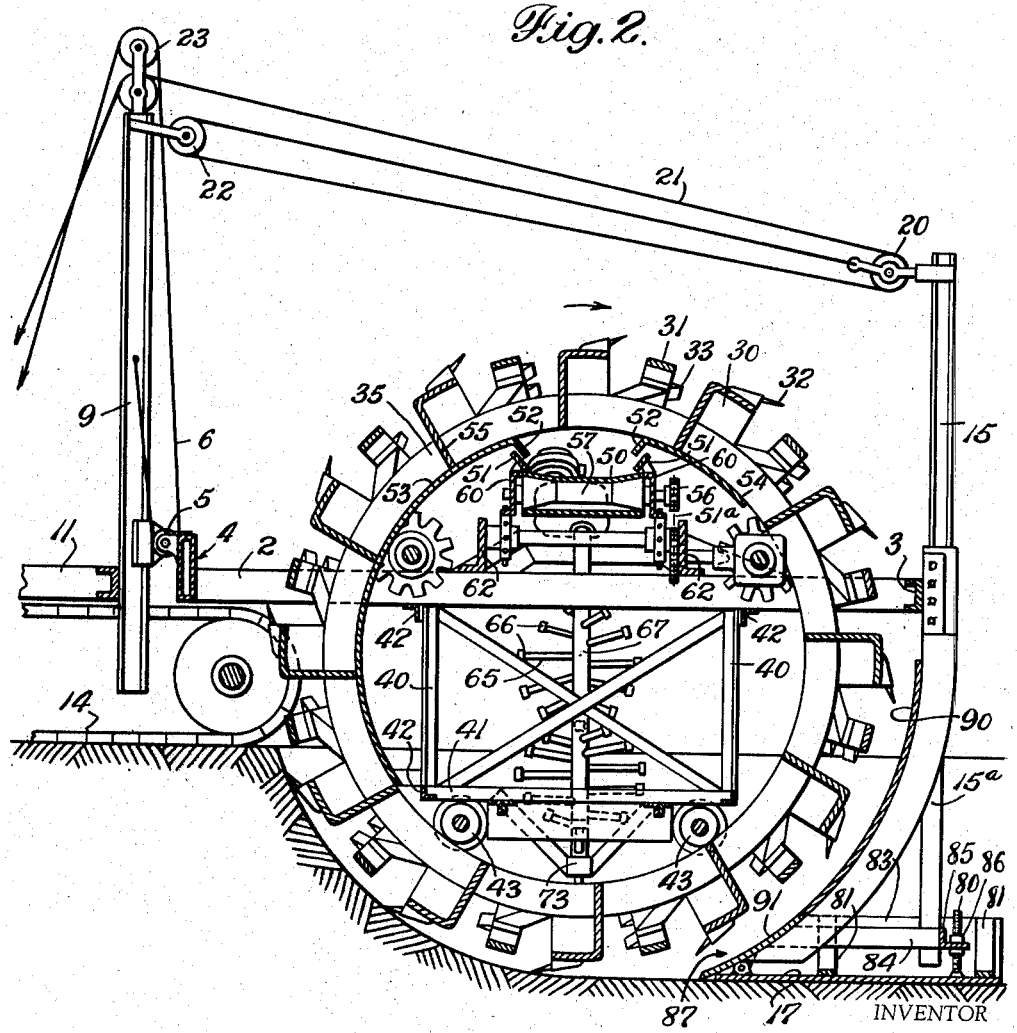
Fig. 2 is a longitudinal sectional view through the excavator wheel of the trencher.
Figure 3:
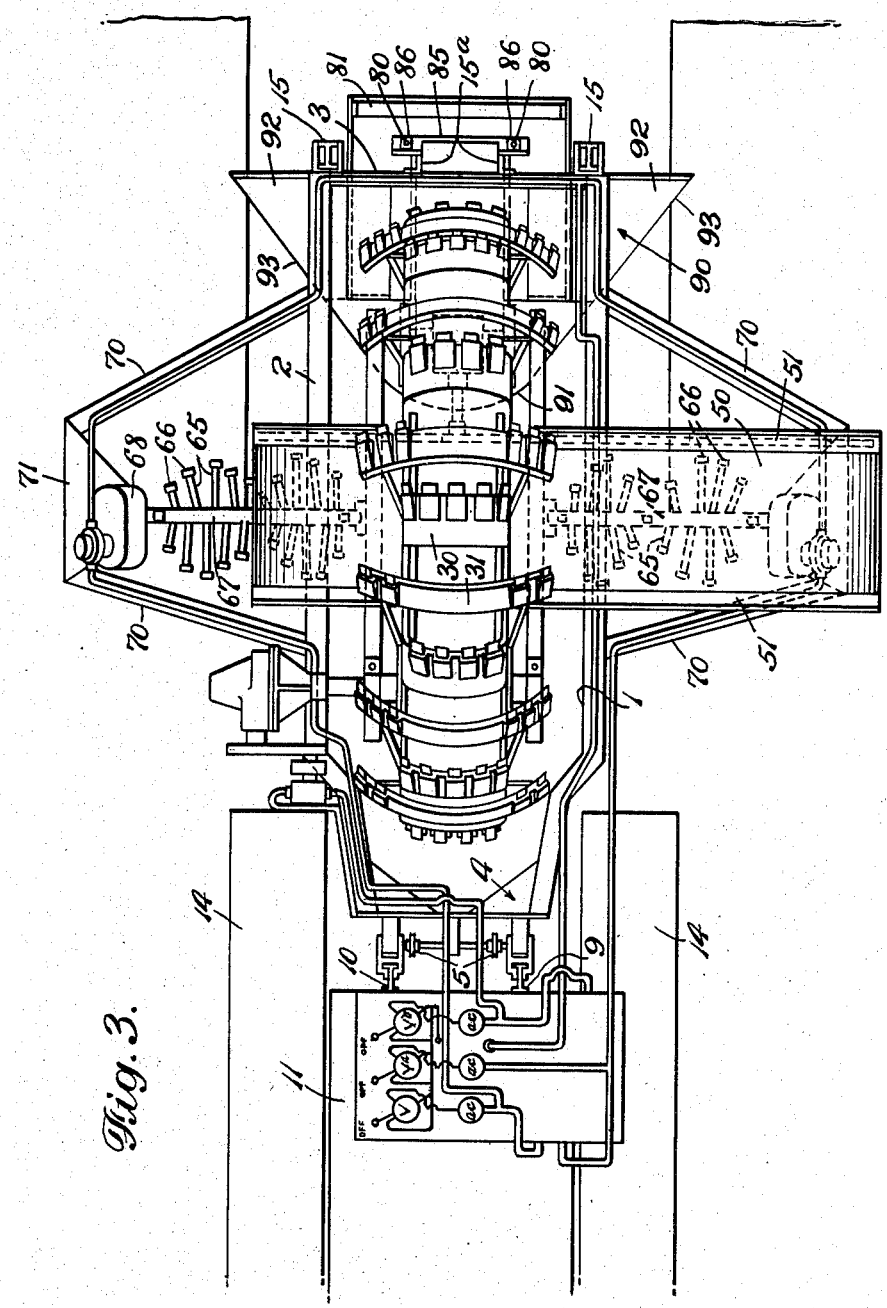
Fig. 3 is a top plan view of the structure including the hydraulic driving mechanism therefor.
Figure 4:
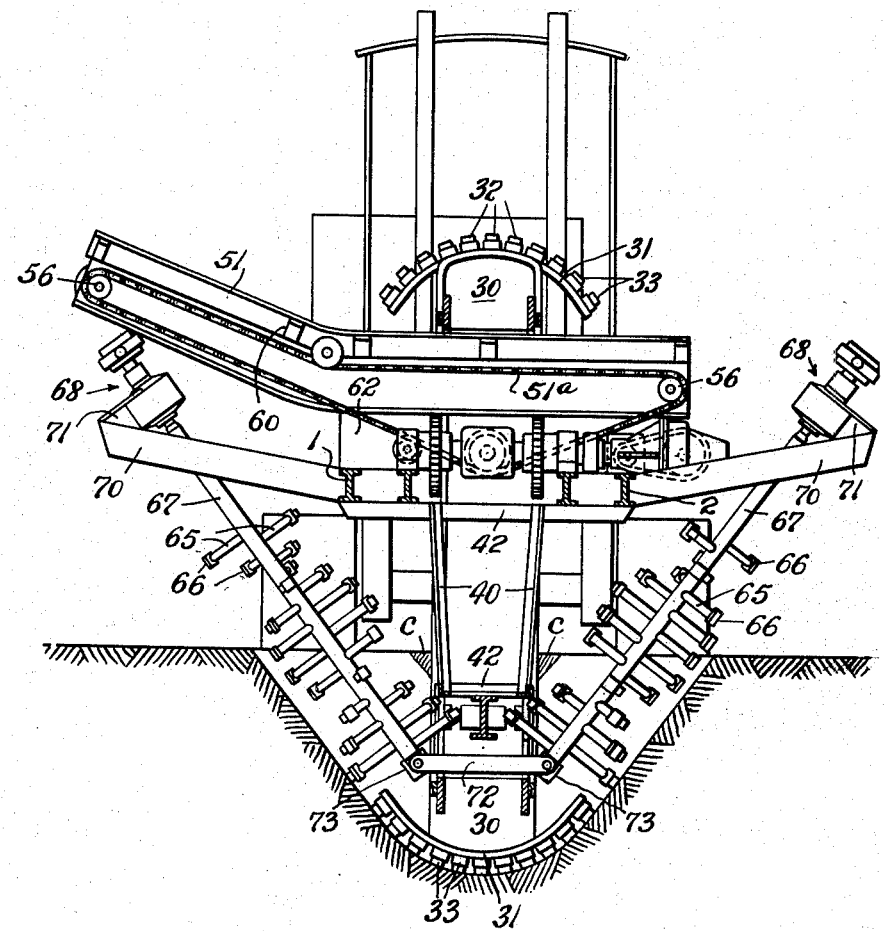
Fig. 4 is a vertical sectional view of the structure of Fig. 1 taken medially of the earth removing conveyor.
Figure 5:
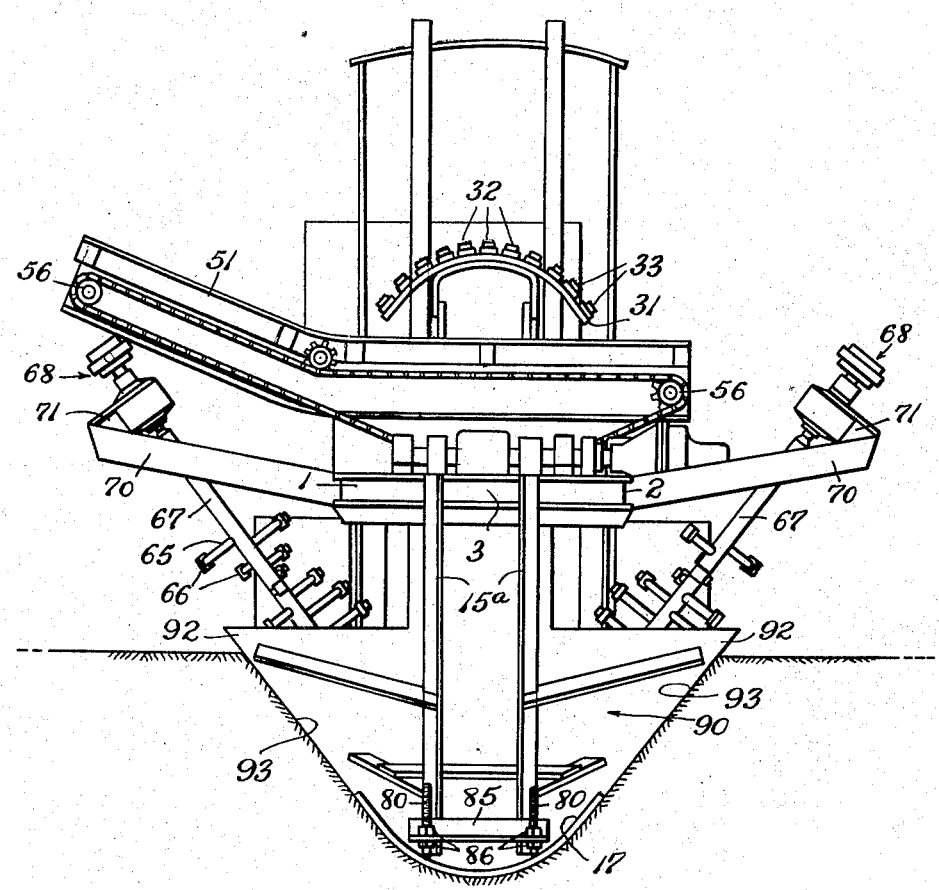
Fig. 5 is an elevation of the machine partly in section showing the moldboard and crumb shoe structure.

The present wheel type trencher is basically modified to provide between the wheel buckets 30, the bottom perimeter cutters 31, best shown in Figs. 2 and 4. In the present instance the buckets 30 carried on the trencher wheel are shown as of arcuate form (see Fig. 2), while the bottom perimeter cutters 31 which are interposed between the buckets 30 are of the same contour, but extend laterally of the buckets to continue the cut of the buckets for the purpose of widening the trench. The buckets 30 include the cutter teeth 32 throughout their entire arcuate structures, these teeth cutting the earth and directing it within the bucket structure as best shown in Fig. 3. The perimeter cutters 31 have teeth 33 of the same shape and type as the teeth 32 of the buckets and generally similarly positioned so that the cut made by the perimeter cutters comprehends a lateral continuation of the same general arcuate or other predetermined shape as made by the bucket teeth. The actual width of the perimeter cutters may be varied and these perimeter cutters 31 are rigidly secured in position in any desired manner, but preferably to permit an interchange of these parts where the lateral width is to be altered.

The trencher wheel is generally of conventional form and includes the rim structure 35 with the usual toothed structure 36 at each side of the wheel, this toothed structure being in mesh with the driving gears 37 mounted on the shaft 38 and supported in bearings 39 on the horizontal wheel frame 1 and 2 for delivering power to the trencher wheel. The source of power will be more fully hereinafter described.

As is conventional in such structures, a wheel frame is provided and its uprights are indicated by reference character 40 with its bottom horizontal structure at 41 and connecting cross bracing at 42. This wheel framing supports the wheel dollies 43 and these wheel dollies may be either two or three in number according to whether more than one set of driving sprockets 37 are utilized, it being understood that the number of driving sprockets will be changed in accordance with the requirements, as determined by the size of the trencher wheel. Both the forward edges of the buckets 30 and of the bottom perimeter cutters 31 are provided with cutting edges to facilitate their movement through the earth which is being excavated. As is well known in the art, the trencher wheel, see Fig. 2, rotates in the direction of the arrow, being carried at the rear of the tractor and generally medially of the crawler wheels 14, normally pockets earth in the buckets and carries it to a discharge belt 50 which is positioned substantially centrally with respect to a transverse plane through the axis of the trencher wheel, the conveyor belt being driven to deliver earth laterally of one side of the trench as best shown in Fig. 4, and being of sufficient width so that the entire load will be delivered to the endless discharge belt indicated at 50. This belt 50 has side guards 51 which prevent lateral discharge and these side guards which extend longitudinally of the direction of the belt and at each side thereof and transversely of the wheel are associated with the flanges 52 of the dirt shields 53 and 54 fixed to the wheel framing and formed as arcuate plates against which the radiating walls 55 of the buckets 30 travel to prevent escape of the dirt in the buckets as they move to their inverted and unloading position over the endless discharge belt 50. The endless discharge belt 50 is driven by chain 50ª running over sprockets 56 at each end and centrally of the endless belt, the sprockets 56 being on the ends of supporting rollers 57, the rollers being slightly concave to form transverse elevated ends with association with the guards 51 and shields 53 and 54 to facilitate the pocketing of the material on the belt and prevent its escape during discharge from the excavating trencher wheel. The endless belt 50 is supported by side framing 60 and suitable cross braces, and the entire assembly is supported by brackets 62 mounted on the horizontal frame members 1 and 2.

The buckets 30 of the trencher wheel are indicated by dotted lines in Fig. 7, these dotted lines representing the area of the earth removed by the buckets 30. In Fig. 7 the perimeter cutters 31 are shown diagrammatically and these perimeter cutters as will be noted from this figure extend laterally of the buckets 30 to complete the arcuate base of the trench. Following the formation of the vertical wall trench, the side slope cutters in the form of toothed arms 65, having cutters 66 mounted on diverging shafts 67 from a source of power 68 supported by lateral converging framing arms 70 from the platform 71, function to remove the area C (see Fig. 7)

and complete the diverging side wall structures. The inner ends of the arms 70 are connected with and supported by the horizontal framing 1 and 2 so that these side slope cutters are movable and adjustable with the trencher wheel when the latter is adjusted to maintain the depth of the trench at a predetermined point and in accordance with specifications in order that proper flow within the trench may be available. The bottom of the angularly positioned side slope cutters is mounted at its end on the horizontal support 72, the ends of which mount bearings 73. It will be noted that the cutter teeth 66 on the ends of the arms 65 are arranged spirally so as to reduce the load on the motor by distributing the timing of the work faces of the cutter elements for sequential contact with the earth, and it will be further noted that the path of movement of the cutter elements 66 is such as to provide cutting walls merging with the cut made by the perimeter cutters 31. Thus with the assembly of Fig. 2, there is the initial cut made by the bucket teeth 32, the widening of this cut made by the bucket teeth 32 by use of the teeth 33 of the perimeter cutter interposed between the bucket teeth, and a further angular cut by the side slope cutters arranged spirally on the shaft 67. This forms a cut in accordance with Fig. 4 and removes the earth, including an area C as shown in Fig. 4, the area C collapsing into the path of movement of the excavator buckets and being removed by these buckets together with the rest of the earth that is removed from the trench. The slope cutters are so designed that they will throw the earth toward the center of the trench and thereby eliminate any need for additional conveying means for delivering the earth to the excavator wheel buckets.

At the rear of the machine, the uprights 15ª support the adjustable grade determining supporting shoe structure 17 which is generally in the form of a plate as shown in Fig. 2 and is connected to the upright support 15ª by jackscrews 80. This shoe 17 is reinforced by transverse reinforcing plates 81 which follow the inner contour of the shoe plate 17 and its sidewalls 83. Longitudinal reinforcing members are provided for the sidewalls 83 at 84 and a transverse brace 85 between the two sidewalls 83 in the form of angle iron provides the connection between the jackscrews 80 and the uprights 15. The angle iron 85 has one flange horizontal through which the jackscrews 80 extend and are locked by the nuts 86. The front of the shoe 17 is provided with the plowshare structure 87 to move the earth with the assembly and in a direction for interception by the teeth of the buckets of the wheel.

The conventional trencher wheel is in the main supported and controlled by the cables from a power winch. In usual trench work this device holds the wheel to a fair degree of exactness as to line and grade. However, in hard ground the successive impacts of the bucket teeth cause a bouncing and swaying of the bucket, which is not materially objectionable for pipe line work, but would defeat effort to secure a fine degree of accuracy. Further, the depth of trench could change rapidly because of longitudinal tipping of the machine on uneven ground.

In using the grade determining stabilizer, tension is maintained on the cables but sufficient weight is settled on the stabilizer to maintain firm contact with the trench bottom, and thus prevent side sway and tendency to bounce. Its nearly flat longitudinal shape prevents any sudden lowering of the trench bottom, but with the cables slacked it will allow a slow gradual deepening of the trench. Its weight also prevents any sudden upward tipping unless extreme tension is applied to the cables.

This grade determining stabilizer functions, in addition to the cables which raise and lower the wheel, as a support for the wheel, being adjustably connected to the wheel frame so that the bottom of the shoe 17 will travel in a proper plane and at a depth determining the cut of the excavator wheel. The depth of the cut of the excavator wheel can be determined by adjusting the distance between the bottom of the shoe and the horizontal wheel supporting frame members 1 and 2, it being remembered that the excavator wheel by virtue of its central framing is supported from the horizontal beams 1 and 2, together with the endless conveyor 50 and other earth moving equipment directly associated with the wheel. The specific bracing for the parts may be constructed or modified in accordance with the size of the equipment and the nature of the work being accomplished.

A moldboard shown in Fig. 3 and indicated generally by reference character 90, provides for the smoothing of the base of the trench and the side walls of the trench to eliminate the serrations in the trench surface left by the cutting teeth of the buckets, bottom perimeter cutters and side slope cutters. The moldboard structure 90 includes a forward bottom trench engaging plate 91 having its outer edge contoured to provide for the surfacing of the trench in the proper manner and wings or screeding plates 92 with angular faces 93 which smooth the diverging side walls following the removal of earth by the side slope cutters. The entire trenching assembly produces an inverted truncated cone with a rounded reduced bottom end portion in accordance with the shape of the excavator buckets and the perimeter cutter, although in some instances, the bottom of the cutters could be flat to comprehend a true inverted truncated cone shaped trench in cross section.

Figure 6:
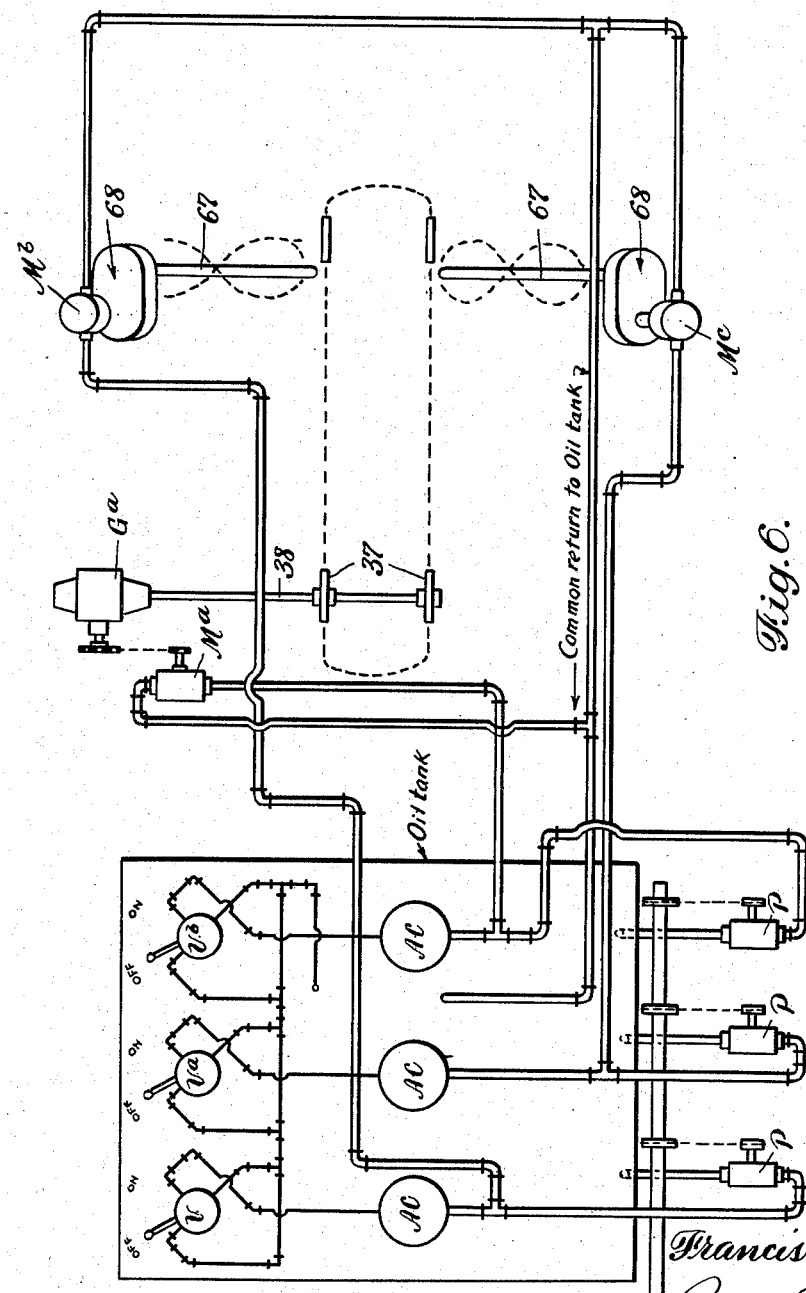
Fig. 6 is a diagrammatic disclosure of the hydraulic drive and control mechanisms for the assembly of Fig. 1.

Referring to Fig. 6 there has been illustrated a hydraulic drive for the equipment of Fig. 1. In this hydraulic drive there is an oil tank from which oil is pumped by a series of pumps P placed under pressure which is stabilized by the accumulators AC, where it further passes through a plurality of control valves V, Vª and Vᵇ, marked "on" and "off". These valves, V, Vª and Vᵇ control the flow of fluid under pressure to the hydraulic motors Mᵇ, Mᶜ and Hª. The hydraulic motor Mª furnishes power to a gear box Gª which drives the main trencher wheel through the sprockets 37 fixed on drive shaft 38, the fluid from the motor Mª returning to the tank as shown. The motor Mª is obviously controlled by the valve Vᵇ and such valve is used to regulate the passage of fluid in accordance with requirements. The motors Mᵇ and Mᶜ are controlled by the valves V and Vª, and through gear assemblies in gear boxes 68 drive the shafts 67 which carry the side slope cutters.

It has been found that in excavating work of the type contemplated for use by the mechanism disclosed, that variations in the density of the earth, shale structure, gravel, and the like may tend to cause fracturing of the digging mechanism where a positive drive is utilized. By the use of hydraulic driving mechanism exceptional flexibility is present insofar as the cutters and drive mechanism are concerned and a more regular and uniform operation is found possible. It is also possible, where the work requires adjustments, to more readily adjust the mechanism inasmuch as the power can be transferred from the motors through flexible coupling means.

In that form of the invention shown in Figs. 10–14, a different assembly is illustrated for cutting a deeper and wider ditch. In the assembly of Figs. 10–14, the excavator wheel 100 with its buckets 101 are considerably larger than similar parts in Figs. 1–6, and consequently provide for the cutting of a wider and deeper initial trench structure. The wheel 100 is supported on the pivoted horizontal supporting arms 102 normally adjustably mounted by the guideways 103 on the uprights 104 supported on the endless track tractor M. The wheel is provided with the lateral discharge endless conveyor 105 mounted on supports 106 supported on the horizontal framing 102 and the conveyor belt 105 is driven by a motor 107 through sprocketed chains 108. The side wall shields 109 and guards 110 are provided for the endless conveyor 105, as in the previous form of the invention.

Figure 10:
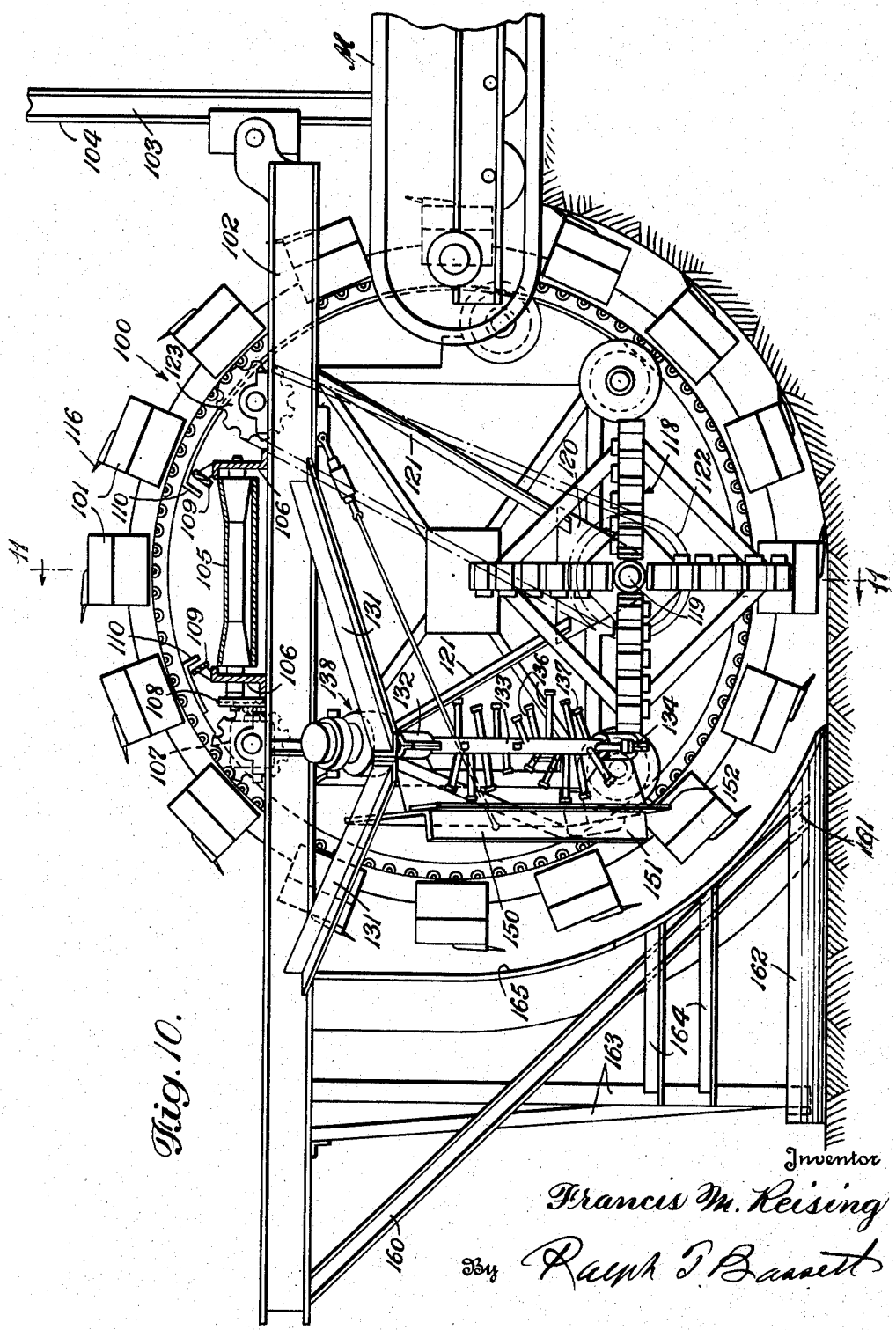
Fig. 10 is a side elevation of a modified form of the invention, including auxiliary conical side wheel undercutters.
Figure 11:
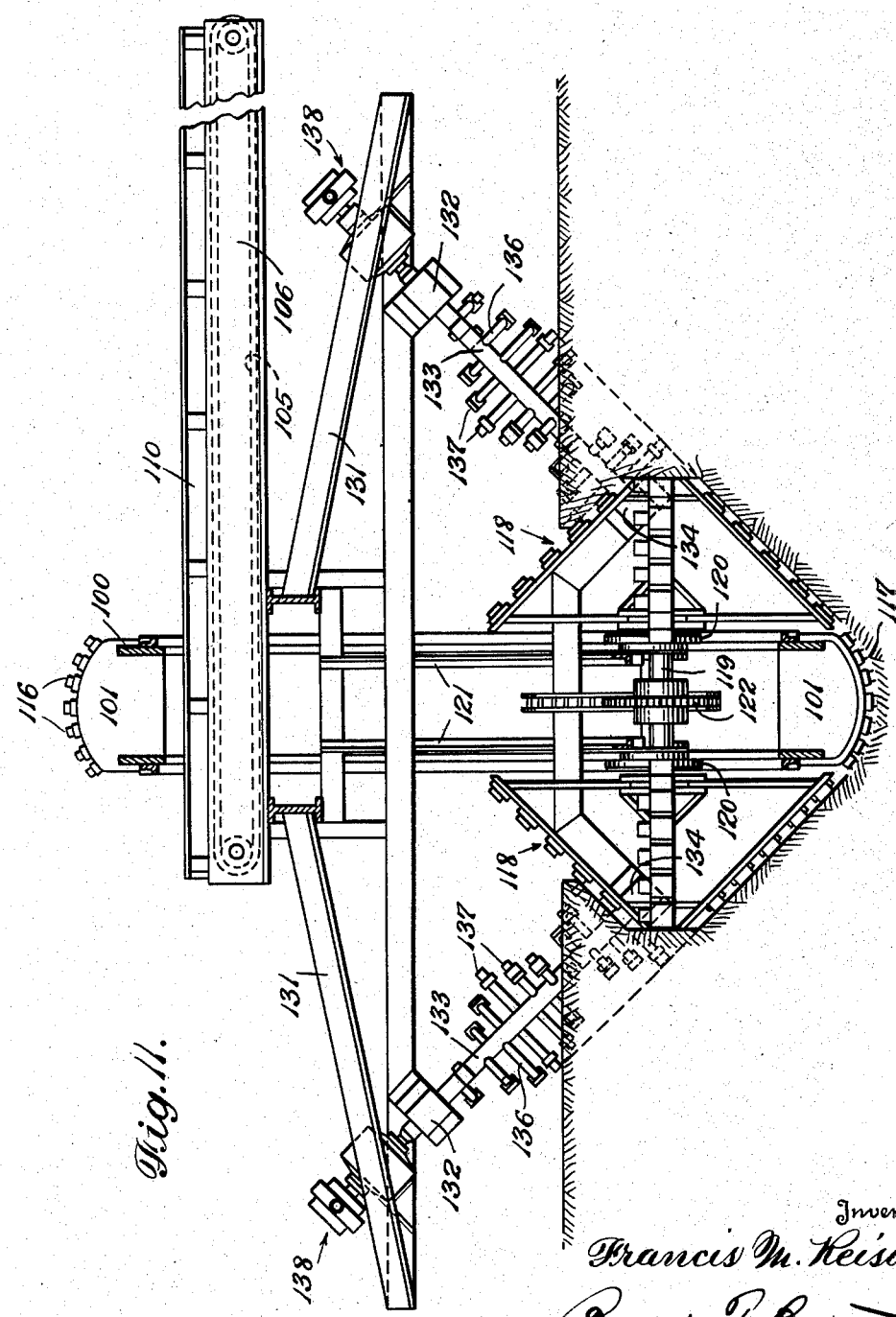
Fig. 11 is a section on line 11—11 of Fig. 10.
Figure 12:
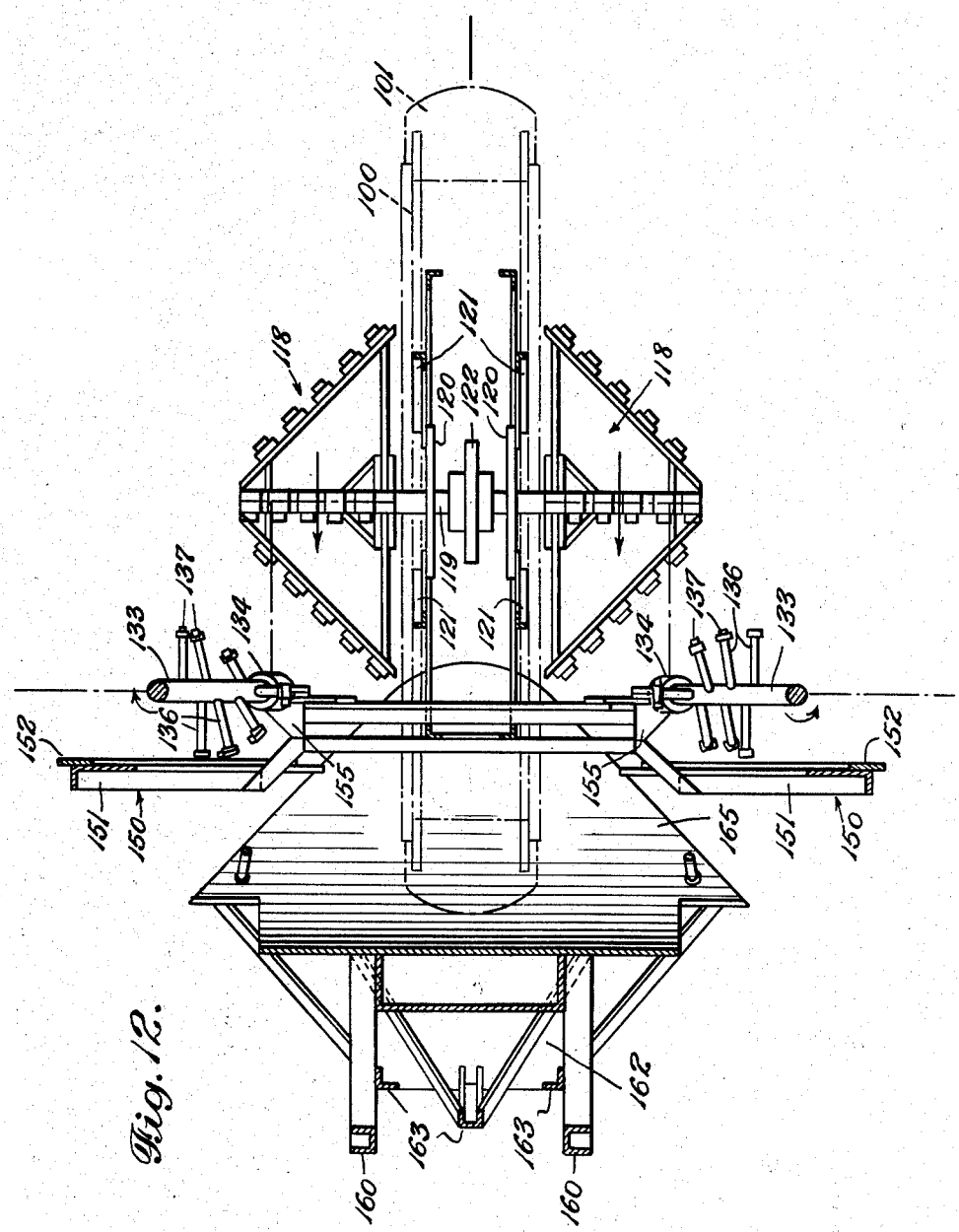
Fig. 12 is a top plan view partly in section showing the conical undercutters and moldboard, the latter being in section, and other parts being shown in dotted lines.

The buckets 101 of the trencher wheel 100 are shown with teeth 116 in arcuate form for shaping the bottom of the trench 117 in an arcuate form, the buckets 101 removing the earth in the usual manner as is conventional in the art and delivering it to the laterally extending discharge endless conveyor 105 in the usual way. Radiating from each side of the trencher wheel and lying in a transverse plane intersecting the axis of the trencher wheel 100 are truncated cone cutters 118, these cone cutters being mounted on a horizontal shaft 119 supported in bearings carried in frame member 120 supported by angle braces 121, these bearings and braces extending downwardly from each side of the main horizontal frame members 102, as shown in Fig. 10, and suspending the shaft 119 in its bearings. A sprocket 122 is mounted medially of the length of the shaft 119 and is driven from a suitable source of power through sprocket 123 to drive the angularly arranged cutters forming the truncated cutter 118. The structure of this cutter is best shown in Fig. 10.

The main trench with its vertical walls are formed by the buckets 101 of the trencher wheel 100 and the truncated cutters 118, positioned as described above, which undercut the side walls of the trench at each side and at the bottom of the trench to leave wall areas of angular cross-section as shown at 130, and best shown in diagrammatic Figs. 15 and 16. It will be noted that the cutting teeth of the cone shaped cutters 118 have their angular cutting faces merging with the arcuate cut at the bottom of the trench provided by the teeth 116 of the trencher wheel and that this cut leaves the angular area 130 which is removed by the side slope cutters arranged rearwardly of the truncated cutters 118 and supported at their outer ends by the angle braces 131 which support the bearings 132 in which the upper end of the shaft 133 is mounted. As shown in Figs. 10–14, the slope cutters are in the nature of spirally arranged arms 136 having cutter ends 137 to reduce the surface area of contact and the load on the motor 138, shown in Figs. 10–14. The lower end of the shaft 133 is mounted in bearings 134 connected to the wheel framing as shown. This side slope cutter, because of its arrangement with respect to the cone shaped undercutter, removes the angular portion of the trench indicated at 130 and because of the arrangement of the cutter and its structure, delivers the earth from its area of action to the main trencher wheel for removal. Immediately at the rear of the slope cutters are the screeding plates 150, these screeding plates having angularly flanged edges 151 to give rigidity to the structure to which the scraping plate 152 is connected. The scraping plate 152 follows the wall of the cut as well as of the slope cutter to remove the roughened surface resulting from the nature of the work of the spiral cutters. The screeding plates are supported by braces at 153 and additional braces 155 which are connected to the trencher wheel inner framing.

In the modifications of Figs. 10–14, the adjustable grade determining stabilizing shoe structure is shown as set forwardly on the horizontal main beams 102 to provide for a rearwardly extending angular brace 160, these braces being connected at their upper outer ends to the outer free ends of the horizontal supports 102 and extending forwardly and downwardly for a suitable connection at 161 with the supporting shoe 162. Rear vertical supports 163 extend from the rear of the shoe upwardly to the beams 102 and horizontal braces 164 connect the vertical beams with the forward framing and with the scraper plate 165. It will be obvious to one skilled in the art that the shape and size of the ditch will require modification and adjustment of the shoe structure per se, and for this reason supporting equipment for this part of the assembly must be provided permitting convenient tooling for a particular job.

Figure 13:
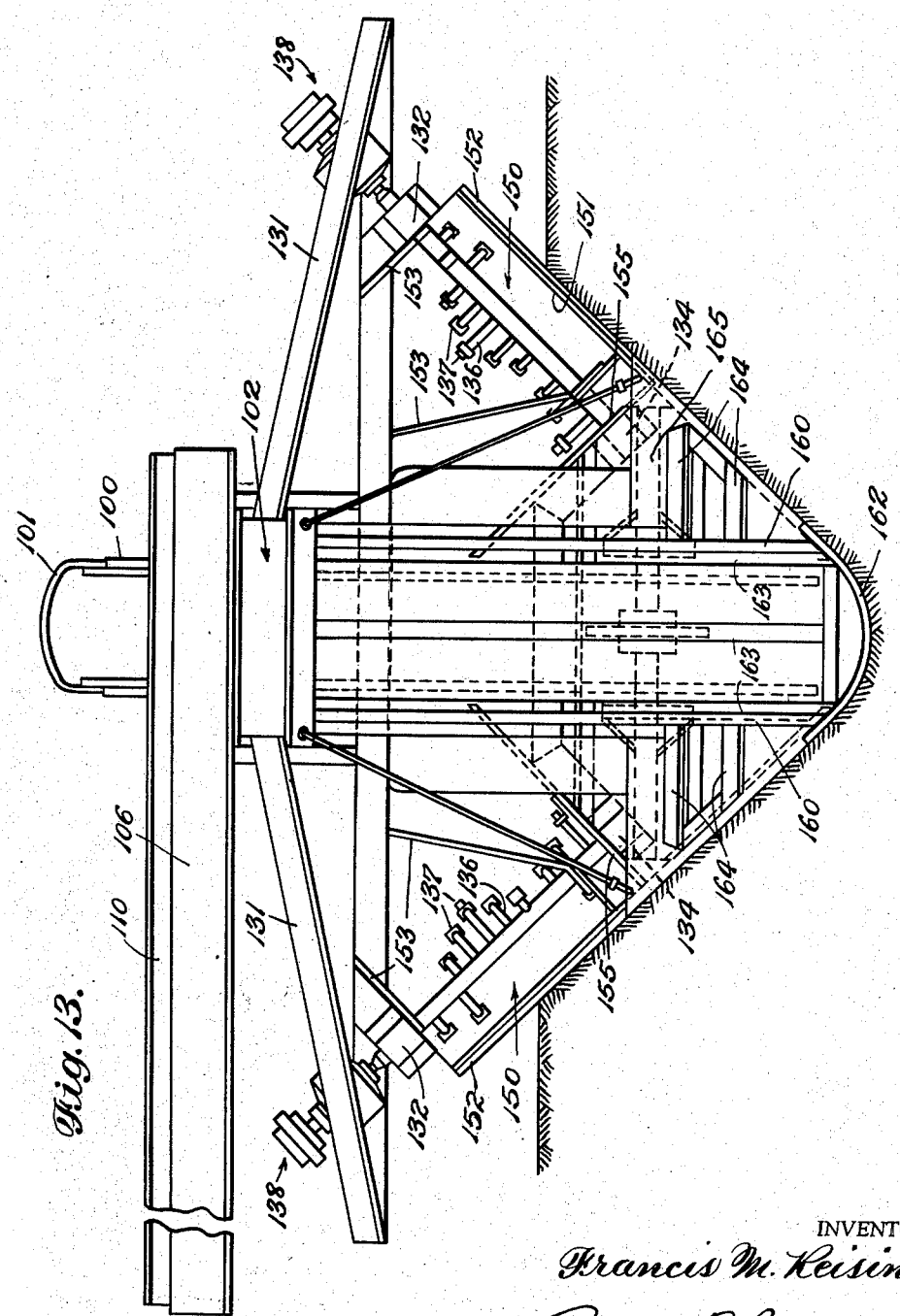
Fig. 13 is a rear elevation of the assembly shown in Fig. 10.

As shown in Fig. 13, the bottom perimeter cutters of the buckets on the trencher wheel, or if a chain cutter is used, the buckets of the endless chain cutter, normally provide a roughly cut area as the result of the shape and working of the cutting teeth. In instances where necessary, there may be associated with the bottom perimeter cutters of the trencher assembly not only toothed bottom perimeter cutters, but smooth perimeter cutters, and these smooth perimeter cutters may be dispersed in an appropriate manner to accomplish a finished operation, it being obvious that the more perfect the finished cut of the ditch or trench and the more accurate the work of the assembly, the less difficulty will be had in the lining of the ditch or trench in the customary manner by the use of concrete, brick, bituminous material or plastics as the specification may require. In other words, it is desirable and economical to have the cut earth of the trench finished to a fine degree of exactness so that the lining will be of uniform thickness and the flow surface of the lining uniform. This condition eliminates considerable expense and labor in the applying of the lining as such linings are intended to be laid by machinery from which the flow of lining material is generally constant and uniform.

The same thought concerning the accurate surfacing of the trench bottom applies to the side walls and it is in this connection that the side slope cutters, auxiliary bottom wideners and screeding plates are associated to provide maximum efficiency. As previously stated, the side slope cutters and the undercutters are mounted so as to be adjustable to obtain the desired angle and with these parts the screeding plates are properly associated to secure the most perfect finish of the trench walls. It will, of course, be understood that in instances where the side walls of the trench are to be of arcuate form, or in other words, the entire trench is to comprehend in cross-section the arc of a circle, the side slope cutters and the undercutters will be shaped to secure the desired surface. The modification of the slope cutters and undercutters by altering their work surface from straight to curved surface or otherwise will not in any way effect the efficiency of the working parts.

Figure 18:
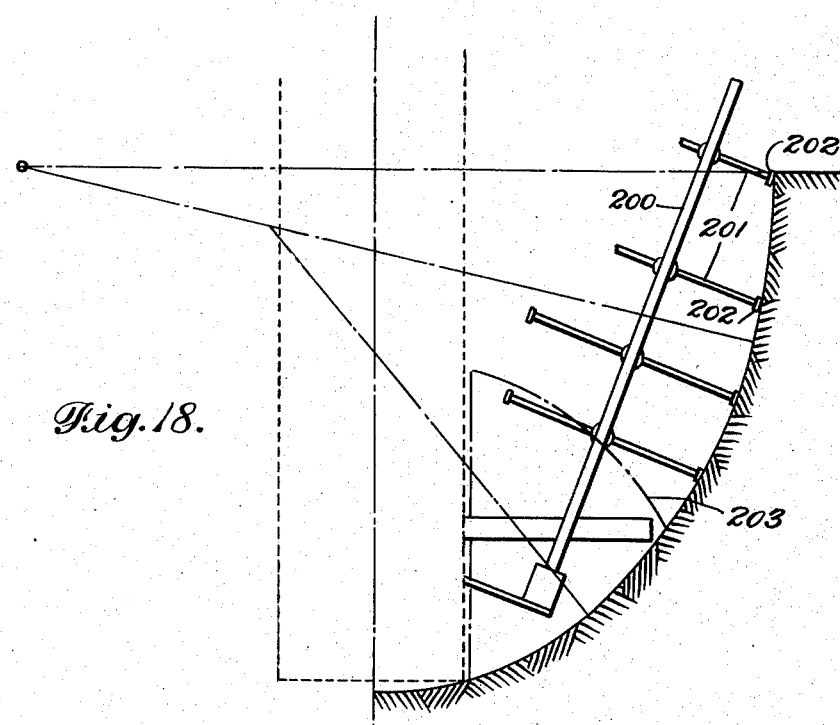
Fig. 18 is a diagrammatic partial transverse section showing a modified form of side slope cutter for producing an arcuate cut, and illustrating the combination of radii between the main wheel cutter and side slope cutter.
Figures 19, 20, 21, 22, 23, 24:
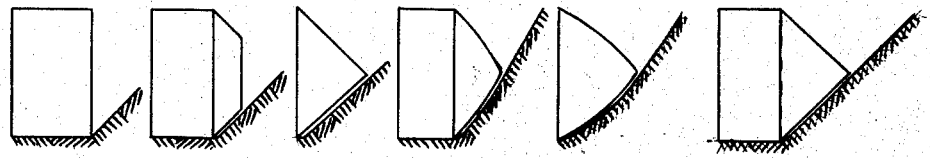
Figs. 19 through 24 are diagrammatic illustrations of side cutters of modified form utilized in forming a trench of predetermined cross-section.

In Fig. 18 a side slope cutter is illustrated with the arms shortened in a manner to provide an arcuate cut and from this figure it will be seen that the shaft 200 has spirally arranged cutter arms 201 with cutting heads 202. The length of the cutting arms 201 are gradually tapered to provide the necessary and predetermined curve. This may be accomplished by adjustment of the arms with respect to the shaft or by substituting shorter arms as required by the nature of the work. In all instances the drive shaft which rotates and is driven from a suitable source of power remains in a true line between bearings.

In connection with the disclosure of Fig. 18, the auxiliary side wheel cutters 203 are shown, it being understood that the disclosure only illustrates one side of the wheel structure. In this illustration the auxiliary side wheel cutters 203 complete the arc initiated at the wheel cutter and fill that area of side wall surface between the wheel cutters and the side slope cutters. Regardless of the work being accomplished, the various cutting elements are so constructed and arranged that the spoil from the cutting operations falls into the trench bottom and is carried out by the main cutter wheel or equivalent assembly. This will be obvious by considering the side slope cutters in which the cutter elements are mounted on the rotary shafts and adjustably supported, the cutter teeth being placed about the shaft in spiral auger-like fashion and staggered in a manner to obtain unit chopping sections. The spiral placement of the teeth not only reduce the load on the drive mechanism, but likewise propels the loose soil in a downward direction to convey the soil to the center or main cutting wheel so that it is removed from the excavation.

In Figs. 19 through 24 there has been illustrated some of the forms of the shapes contemplated by the auxiliary cutters which are directly and immediately associated with the cutting surface formed by the main exacavator cutting wheel. These illustrations are right hand cutters only as viewed from the rear of the machine and it will be observed with reference to the other illustrations of the instant invention that these auxiliary shaping cutters are mounted on a horizontal shaft approximately midway of the trencher wheel. It is contemplated that when these auxiliary shaping cutters are used the side slope cutters will be located in the rear of these auxiliary cutters.

In Figs. 25 through 29 diagrammatic disclosures illustrate modified assemblies and modified parts for producing various cross-sectional forms of trenches. In Fig. 25 the auxiliary cutters associated with the trencher wheel 100 are indicated by reference character 205, these cylindrical cutters having their axis in a plane so that they will continue the cut of the trencher wheel 100, the latter being shown of a form to make a flat surface cut. In association with this wide bottom trencher assembly, the side slope cutters 206 are provided, only one being shown at one side but it being understood that a similar slope cutter 206 will be provided for removing earth from the opposite flaring side wall. In the diagrammatic disclosure of Fig. 26, the trencher wheel 100 is illustrated with the undercutters 207 of generally cone form but with their cutter arms reduced in length to provide an arcuate cut which is continued by the side slope cutters 208, only one of which is shown and which will be duplicated on the other side to produce side walls of the same angle.

In Fig. 27 the trencher wheel 100 is shown with a pair of side cutters in the form of truncated cones 209. In the illustration of Fig. 27 the trenching operation is relatively shallow and the conical cutters are used for removing the full height of the side walls of the trench. Fig. 28 shows the trencher wheel 100 having its cutting edge 210 shaped to produce a flat cut which is widened by the armed laterally projecting cutter 211 functioning in the same manner as the cutter 207 in Fig. 26, but purely in a horizontal plane. Associated with the horizontal armed cutters 211 are the side slope cutters 212 with the usual spiral arrangement of cutter teeth. In Fig. 29 the trencher wheel 100 is of the same general type as Fig. 27 for making a flat bottom trench face and in this assembly one side of the trencher is provided with a relatively wide cone-shaped side cutter 214 and the spiral side slope cutters 215. The other side of the trencher wheel 100 merely utilizes the side slope cutters 216 so that one lateral side wall is at one predetermined angle and the other side wall at a different angle as required. These various figures illustrate the versatility of the assembly and it will be obvious to one skilled in the art that the modifications may be further altered by the use of additional and different cutters and additional combinations of cutters.

In both forms of the invention illustrated smoothing or screeding cutters or plates are used in association with the grade determining stabilizer and these devices function to smooth the surfaces cut by the cutting devices and retain all of the spoil or loose soil and feed the same to the area of the bottom of the trench where it may be picked up and removed by the buckets on the wheel or conveyor belt. It will be understood that these screeding plates will be removably connected so that desirable shapes and configurations may be substituted in accordance with the trench being formed.

It will be understood, of course, that the individual side cutter elements which are utilized in connection with the side slope cutters and undercutters cooperate with the main screeding plate carried by the grade determining stabilizer, and all of the parts are related and associated to provide a uniform and constant feeding of the loose soil for removal by the main excavator wheel.

In considering the present development it will be obvious to one skilled in the art that the versatility of the equipment involved is of paramount importance. For instance any and all of the equipment may be interchanged or arranged to provide predetermined contours in the ditch or trench cross section, this being necessary in order to produce ditches whose specifications vary from the conventional. In the ditching and trenching operations, the size of the ditch, the material constituting the earth structure, the volume of water required, and other characteristics or factors may necessitate modification of the cross sectional ditch contour. As an illustration, Figs. 30 and 31 above show types of variation in trench cross sections. In Fig. 30 two arcs 300 and 301 are merged with the tangent 302 completing the side wall plan. In Fig. 31 two arcs 303 and 304 are merged and tangents 305 and 306 complete the side shape.

In some instances it is desirable and in fact essential to form near the upper margin of each trench side a berm to strengthen the wall and/or to catch the earth that may roll down from the top. To accomplish this there is illustrated in Fig. 32 a striker or cutter which includes a hub 311, arms 312 and cutters 314. The hub is adjustably secured at a predetermined position along the shaft 315 of the side slope cutter by bolt 316 or other suitable securing means.

In Fig. 33, a superimposed assembly of side cutter and side slope cutter is diagrammatically illustrated. The usual side cutter 320 is supported to operate in the plane of the wheel 321 and above this side cutter is the auxiliary cutter 322, in form shown as a smaller adaptation of the main side cutter 320. This main cutter 320 and auxiliary cutter 322 are driven through a suitable source of power to secure the required relative speed to remove the earth adjacent the wheel to the center of the trench for further removal by said wheel. Similarly the auxiliary over side slope cutter 323 is arranged parallel to and is associated with the main side slope cutter 324. Such auxiliary cutters are used when the trench is relatively deep and the wall area is such that a single cutter element will not be sufficient to remove the required earth structure. In Fig. 33 the excessive area 325 is left and removed as heretofore described. In this same Fig. 33 it will be obvious that the cutters may be shaped to provide any desired contour of the trench wall, as for instance, the main side cutter 320 may make an arcuate cut and the side slope form a tangent thereto.

The variations in arrangement of cutters and in use of cutters as shown is not a limitation, but merely illustration of the capabilities of the invention which can be interchanged as desired and as required by conditions.

What I claim is:

1. In an excavator, a portable power driven tractor assembly including a frame having laterally extending inwardly converging arms, spaced uprights mounted on the tractor assembly, vertically adjustable spaced swinging load supporting elements carried by said uprights, a rotary excavator including a plurality of excavator buckets mounted between said load supporting elements, a laterally extending material conveyor carried by said supporting elements for removing earth from said rotary excavator, digger members mounted on said excavator and projecting laterally of the excavator buckets and interposed therebetween for undercutting the walls of the trench formed by said rotary excavator, and diverging side slope cutters mounted on the frame, said side slope cutters being supported at their lower ends in bearings supported by said frame, and including a shaft and spirally arranged earth working elements, said elements projecting outwardly from said shaft, said shaft extending above the frame to the outer extremities of the inwardly converging arms and including a fluid motor assembly for rotating said shaft, means for applying hydraulic pressure to said fluid motor for rotating said shaft, and screeding plates supported rearwardly of said diverging side slope cutters, said screeding plates being adjustably supported from said frame.

2. In an excavator, a portable power driven tractor assembly including a frame, spaced uprights mounted on the tractor assembly, normally horizontally arranged swinging load supporting elements carried by said uprights, an excavator wheel having a plurality of spaced excavator buckets mounted about its periphery, said excavator wheel being supported on said swinging load supporting elements, a plurality of perimeter cutters interposed between the buckets on said wheel, said perimeter cutters extending laterally of the buckets and having cutter elements arranged for a continued aligned cutting operation at each side of the buckets, lateral supports projecting from each side of the load supporting elements and supported thereby, fluid motors carried by said lateral supports, a shaft driven by each of said fluid motors, said shafts being mounted in bearings, the shaft bearings at the upper ends of the shafts being supported by said lateral supports and the bearings at the lower ends of the shafts being mounted on the frame and spaced inwardly of the upper bearings, a plurality of spirally arranged toothed arms carried by each shaft, a vertically adjustable support carried at the free end portions of said swinging load supporting elements rearwardly of said excavator wheel, and a shoe member carried at the end of said vertically adjustable support for engaging the bottom of the trench for supporting the free ends of said load supporting elements.

3. The structure of claim 2 characterized in that screeding plates are provided on said vertically adjustable support for resurfacing the walls of the trench being formed by the assembly.

4. In an excavator, a power driven tractor assembly, upright frame members mounted on one end of the tractor assembly, spaced vertically swinging load supporting elements carried by said upright frame members, an excavator wheel supported by said swinging load supporting elements, buckets mounted on said excavator wheel, power means carried by said swinging load supporting elements for rotating said excavator wheel, a wheel frame, an undercutting element supported on said wheel frame at the lower portion thereof for removing earth lying laterally of the wheel and below the ground surface, adjustable angular side slope cutters carried by the swinging load supporting elements and spaced rearwardly of the undercutting element for removing angular portions of the side walls of the trench left by said undercutting element, said side slope cutters including a shaft and a plurality of individually mounted spirally arranged cutters, said cutters projecting outwardly from said shaft, and means carried by the swinging load supporting elements for maintaining the wheel in an adjusted position to make a cut of predetermined depth.

5. In an excavator, a power driven tractor assembly including a frame, spaced swinging frame members mounted at one end of the tractor assembly, an excavator wheel including buckets, a wheel frame within the excavator wheel, means supporting said wheel frame on the swinging frame members permitting rotation of the excavator wheel, means driving said excavator wheel, a supporting structure projecting from the upper portion of the wheel frame, cutting elements carried by the outer end portions of the projecting supporting structure including a shaft and spirally mounted cutters, a bearing mounted on said wheel frame for supporting the lower end of the shaft laterally of the frame, said cutting elements being spaced rearwardly of a vertical center line extending through said excavator wheel, driving means for said cutting elements, undercutters projecting laterally of each side of the wheel and supported by the wheel frame, said undercutters being positioned at approximately the vertical center of the excavator wheel and including conical cutting faces, and means for driving the undercutting elements.

6. In an excavator, a power driven tractor assembly including a frame, a swinging frame comprising spaced members extending longitudinally of said excavator, said swinging frame being mounted at one end of the tractor assembly, a trench forming excavator wheel including excavator buckets mounted between said swinging frame members, said excavator wheel being provided with an internal frame, hydraulic means for driving said excavator wheel, auxiliary earth cutting elements supported from the wheel frame and positioned laterally of the excavator wheel for sequentially removing earth portions at each side of the trench, and separately controlled hydraulic means for driving said auxiliary earth cutting elements.

7. The structure of claim 6 characterized in that the auxiliary earth cutting elements are positioned to remove earth from the side walls of the trench at variable predetermined angular depths.

8. The structure of claim 6 characterized in that the wheel frame includes a plurality of projecting supporting members in which the auxiliary earth cutting elements are rotatably mounted.

9. The structure of claim 6 characterized in that the auxiliary earth cutting elements consist of a first pair of elements for cutting the earth at the lower levels of the trench and a second pair of elements for cutting earth at the upper levels of the trench, said pairs of elements being arranged in tandem relation with the earth cutting elements for the lower levels positioned below the earth cutting elements for the upper levels.

References Cited in the file of this patent

UNITED STATES PATENTS

| | | |
|---|---|---|
| 264,062 | Bonnell | Sept. 12, 1882 |
| 340,128 | Kersey | Apr. 20, 1886 |
| 828,831 | Van Buren | Aug. 14, 1906 |
| 1,299,826 | Dewey | Apr. 8, 1919 |
| 1,462,488 | George | July 24, 1923 |
| 1,777,439 | Lamont | Oct. 7, 1930 |
| 2,421,904 | Penote | June 10, 1947 |
| 2,488,016 | Lado | Nov. 15, 1949 |
| 2,620,575 | Pace | Dec. 9, 1952 |
| 2,627,681 | Diotti | Feb. 10, 1953 |
| 2,686,981 | Vaughn | Aug. 24, 1954 |
| 2,736,111 | Moen | Feb. 28, 1956 |